US010180869B2

(12) United States Patent
Go et al.

(10) Patent No.: US 10,180,869 B2
(45) Date of Patent: Jan. 15, 2019

(54) AUTOMATED ORDERING OF COMPUTER SYSTEM REPAIR

(71) Applicant: Microsoft Technology Licensing, LLC, Redmond, WA (US)

(72) Inventors: Alexander Say Go, Sammamish, WA (US); Donald MacGregor, Mercer Island, WA (US); Gregorio Maeso, Kirkland, WA (US); Noah Aaron Cedar Davidson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 15/045,118

(22) Filed: Feb. 16, 2016

(65) Prior Publication Data
US 2017/0235629 A1 Aug. 17, 2017

(51) Int. Cl.
| G06F 11/00 | (2006.01) |
|---|---|
| G06F 11/07 | (2006.01) |
| G06F 11/30 | (2006.01) |
| G06F 11/32 | (2006.01) |

(52) U.S. Cl.
CPC ........ *G06F 11/0781* (2013.01); *G06F 11/079* (2013.01); *G06F 11/0751* (2013.01); *G06F 11/0772* (2013.01); *G06F 11/3031* (2013.01); *G06F 11/0706* (2013.01); *G06F 11/0793* (2013.01); *G06F 11/321* (2013.01); *G06F 2201/815* (2013.01)

(58) Field of Classification Search
CPC ............. G06F 11/0754; G06F 11/0757; G06F 11/076; G06F 2201/81; H04L 41/5009; H04L 43/10; H04L 43/103; H04L 43/16
See application file for complete search history.

(56) References Cited

U.S. PATENT DOCUMENTS

| 4,866,635 A | 9/1989 | Kahn et al. |
|---|---|---|
| 5,483,637 A | 1/1996 | Winokur et al. |
| 5,517,405 A * | 5/1996 | McAndrew ........... G06F 19/345 705/2 |
| 5,881,222 A | 3/1999 | Berry et al. |

(Continued)

OTHER PUBLICATIONS

International Search Report and the Written Opinion issued in PCT Patent Application No. PCT/US2017/017274 dated Apr. 3, 2017.

(Continued)

*Primary Examiner* — Amine Riad
(74) *Attorney, Agent, or Firm* — Workman Nydegger

(57) ABSTRACT

Monitoring the health of a computer system and suggesting an order of repair when problems within the computer system have been identified. Problem(s) and problem entity(s) within the computer system are identified during monitoring. Relationship(s) of the problem entities with other entities in the computer system are identified. A relationship type for each of the identified relationship(s) is determined. A combination of the identified problem(s), the identified problem entity(s), and the determined relationship type(s) is analyzed to determine an order in which repairs of one or more user-visible entities of the computing system should occur in order to address the identified problem(s). An alert comprising the determined order of the repairs is then presented to a user.

20 Claims, 5 Drawing Sheets

(56) References Cited

U.S. PATENT DOCUMENTS

| | | | |
|---|---|---|---|
| 5,928,369 A | 7/1999 | Keyser et al. | |
| 6,000,046 A | 12/1999 | Passmore | |
| 6,675,295 B1 | 1/2004 | Marcelais et al. | |
| 6,697,962 B1 | 2/2004 | McCrory et al. | |
| 6,895,285 B2 | 5/2005 | Maity | |
| 6,993,686 B1* | 1/2006 | Groenendaal | G06F 11/2023 709/224 |
| 7,146,542 B2 | 12/2006 | Srinivasan et al. | |
| 7,194,445 B2 | 3/2007 | Chan et al. | |
| 7,216,169 B2 | 5/2007 | Clinton et al. | |
| 7,409,595 B2 | 8/2008 | Nissan-Messing et al. | |
| 7,421,371 B2 | 9/2008 | Segers et al. | |
| 7,596,469 B2 | 9/2009 | Godara | |
| 7,689,873 B1 | 3/2010 | Bennett | |
| 7,734,945 B1* | 6/2010 | Levidow | G06F 11/0793 714/3 |
| 7,779,308 B2 | 8/2010 | Brown et al. | |
| 7,900,201 B1* | 3/2011 | Qureshi | G06N 5/048 717/120 |
| 8,271,949 B2* | 9/2012 | Bernardini | G06F 11/366 717/101 |
| 8,458,530 B2 | 6/2013 | Kini et al. | |
| 8,493,210 B2 | 7/2013 | Maziak et al. | |
| 8,601,318 B2* | 12/2013 | Huang | G06F 11/0709 709/227 |
| 8,799,701 B2* | 8/2014 | Patani | G06F 11/2028 714/1 |
| 2005/0187940 A1 | 8/2005 | Lora et al. | |
| 2006/0143492 A1* | 6/2006 | LeDuc | G06F 11/0715 714/2 |
| 2008/0294946 A1* | 11/2008 | Agarwal | G06F 11/0709 714/57 |
| 2009/0119545 A1 | 5/2009 | Pham et al. | |
| 2009/0172460 A1* | 7/2009 | Bobak | G06F 11/0709 714/2 |
| 2009/0172470 A1* | 7/2009 | Bobak | G06F 11/1482 714/16 |
| 2009/0172682 A1* | 7/2009 | Bobak | H04L 69/40 718/103 |
| 2009/0228519 A1 | 9/2009 | Purcell et al. | |
| 2009/0292941 A1 | 11/2009 | Ganai et al. | |
| 2009/0310764 A1 | 12/2009 | Gerhart | |
| 2009/0313508 A1* | 12/2009 | Yan | G06F 11/008 714/47.2 |
| 2010/0023604 A1 | 1/2010 | Verma et al. | |
| 2011/0260879 A1 | 10/2011 | Avner et al. | |
| 2011/0264956 A1* | 10/2011 | Ito | G06F 11/0748 714/20 |
| 2012/0110500 A1 | 5/2012 | Kornhall | |
| 2012/0185736 A1 | 7/2012 | Sambamurthy et al. | |
| 2013/0205161 A1* | 8/2013 | Patani | G06F 11/2028 714/4.11 |
| 2013/0305081 A1 | 11/2013 | Agnihotram et al. | |
| 2014/0026002 A1 | 1/2014 | Haines | |
| 2014/0279718 A1* | 9/2014 | Southey | G06N 5/04 706/11 |
| 2015/0058868 A1 | 2/2015 | Padinjarel et al. | |
| 2016/0072688 A1* | 3/2016 | Desai | H04L 41/065 709/224 |
| 2016/0162346 A1* | 6/2016 | Kushnir | G06F 11/079 714/37 |
| 2017/0097860 A1 | 4/2017 | Pang | |
| 2017/0237602 A1 | 8/2017 | Damato et al. | |

OTHER PUBLICATIONS

Wiegers, Karl E., "Writing quality requirements", In Journal Software Development, vol. 7, Issue 5, May 1999, pp. 1-6.

"GoToAssist Create and Manage Alerts", Retrieved from <<https://web.archive.org/web/20150314220941/http://support.citrixonline.com/en_US/gotoassistmonitoring/help_files/G2AMO030003?title=Create+and+Manage+Alerts%7D>>, Aug. 21, 2015, 7 Pages.

"PC Health Monitor _Toshiba Technology Guides", Retrieved from <<https://web.archive.org/web/20151030043251/http://us.toshiba.com/pc-health-monitor>>, 7 Pages.

"Final Office Action Issued in U.S. Appl. No. 15/045,114", dated May 31, 2018, 15 Pages.

"Non Final Office Action Issued in U.S. Appl. No. 15/045,114", dated Nov. 2, 2017, 29 Pages.

Burgess, Brian, "Troubleshoot Computer Problems with Reliability Monitor in Windows 7", Retrieved from <<http://www.howtogeek.com/howto/7473/troubleshoot-computer-problems-with-reliability-monitor-in-windows-7/>>, Dec. 9, 2009, 6 Pages.

"Non Final Office Action Issued in U.S. Appl. No. 15/045,114", dated Oct. 31, 2018, 14 Pages.

* cited by examiner

AUTOMATED ORDERING OF COMPUTER SYSTEM REPAIR

BACKGROUND

Computer systems and related technology affect many aspects of society. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks. Accordingly, the performance of many computing tasks is now being distributed across a number of different computer systems and/or a number of different computing environments.

Cloud computing, in particular, has continued to see large gains in popularity. Cloud computing providers offer users the ability to deploy large and complex computer systems sufficient to meet virtually any computing need. While the large scale of these deployed cloud computing systems provides great flexibility and computing power to users, it also presents great complexity in terms of maintaining the deployed systems in good working condition.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to monitoring the health of a computer system and suggesting an order of repair when problems within the computer system have been identified. Furthermore, based on such monitoring and further automated analysis, alerts may comprise an order for performing repairs such that the safety of the computer system is considered when suggesting the order of repairs. For instance, by suggesting an order of repairs in an alert, performance of the computer system, redundancy of data within the computer system, and other factors may be maintained at the highest level possible during the performance of repairs on the computer system.

For example, in some embodiments, one or more problems within the computer system are identified, as well as one or more entities within the computer system that are causing the one or more problems. One or more relationships that the one or more problem entities have with other entities in the computer system are identified. A relationship type for each of at least one identified relationship is then determined.

A combination of the one or more identified problems, the one or more identified problem entities, and the determined relationship type is then analyzed to thereby determine an order in which repairs of one or more user-visible entities of the computer system should occur in order to address the one or more identified problems. Finally, one or more alerts comprising the determined order of the repairs is then presented to a user. One, some or all of the repairs may be automatically performed in the determined order.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to monitoring the health of a computer system and suggesting an order of repair when problems within the computer system have been identified. Furthermore, based on such monitoring and further automated analysis, alerts may comprise an order for performing repairs such that the safety of the computer system is considered when suggesting the order of repairs. For instance, by suggesting an order of repairs in an alert, performance of the computer system, redundancy of data within the computer system, and other factors may be maintained at the highest level possible during the performance of repairs on the computer system.

For example, in some embodiments, one or more problems within the computer system are identified, as well as one or more entities within the computer system that are causing the one or more problems. One or more relationships that the one or more problem entities have with other entities in the computer system are then identified. A relationship type for each of at least one identified relationship is then determined.

A combination of the one or more identified problems, the one or more identified problem entities, and the determined relationship type is then analyzed to thereby determine an order in which repairs of one or more user-visible entities of the computing system should occur in order to address the one or more identified problems. Finally, one or more alerts comprising the determined order of the repairs is then presented to a user. One, some or all of the repairs may be automatically performed in the determined order.

Because the principles described herein operate in the context of a computing system, a computing system will first be described as an enabling technology for the principles described herein. Thereafter, further details regarding the monitoring of the health of computer systems will be described with respect to FIGS. 2 through 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
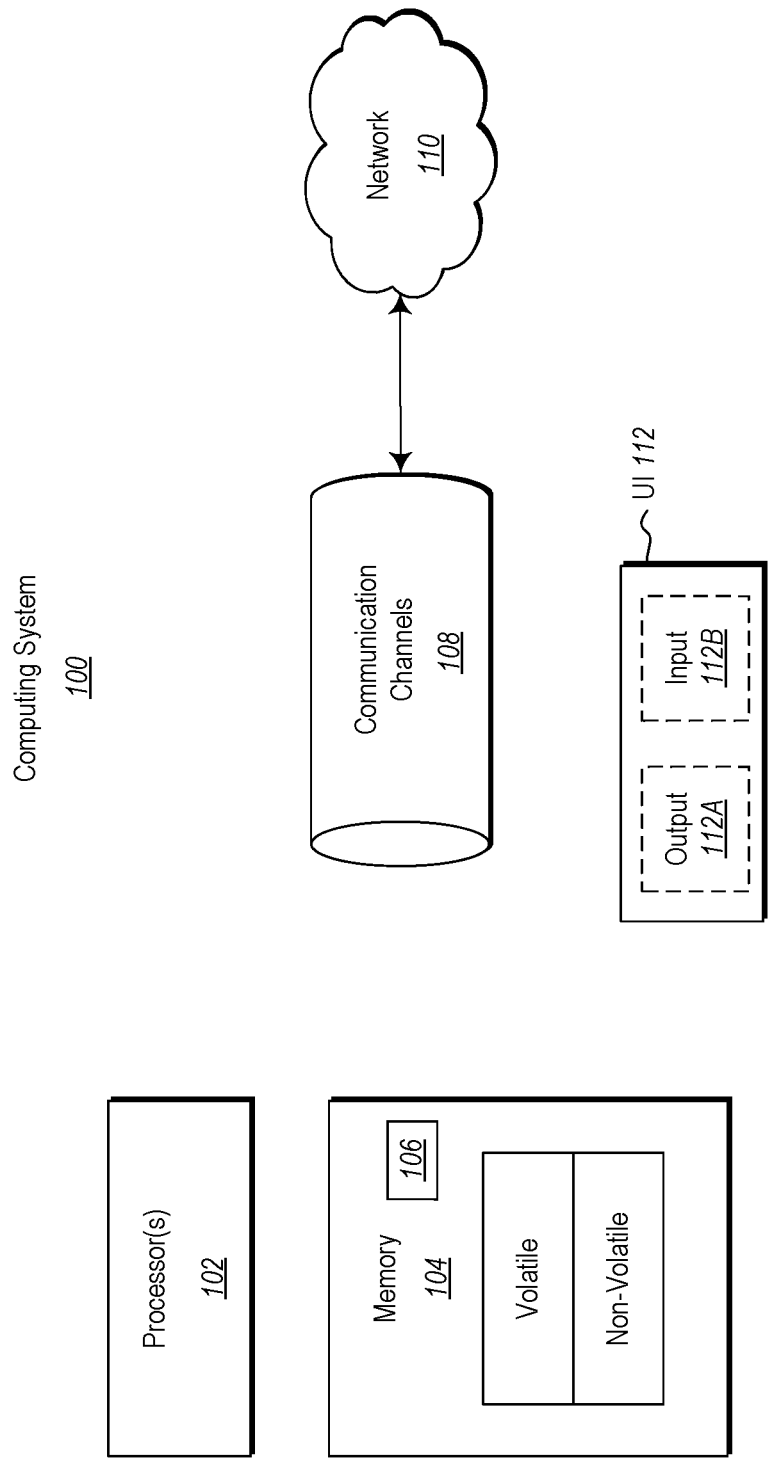
FIG. 1 symbolically illustrates a computer system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "controller", "validator", "runner", "deployer" or the like, may also be used. As used in this description and in the case, these terms (regardless of whether the term is modified with one or more modifiers) are also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth. In accordance with the principles describe herein, alerts (whether visual, audible and/or tactile) may be presented via the output mechanism 112A.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
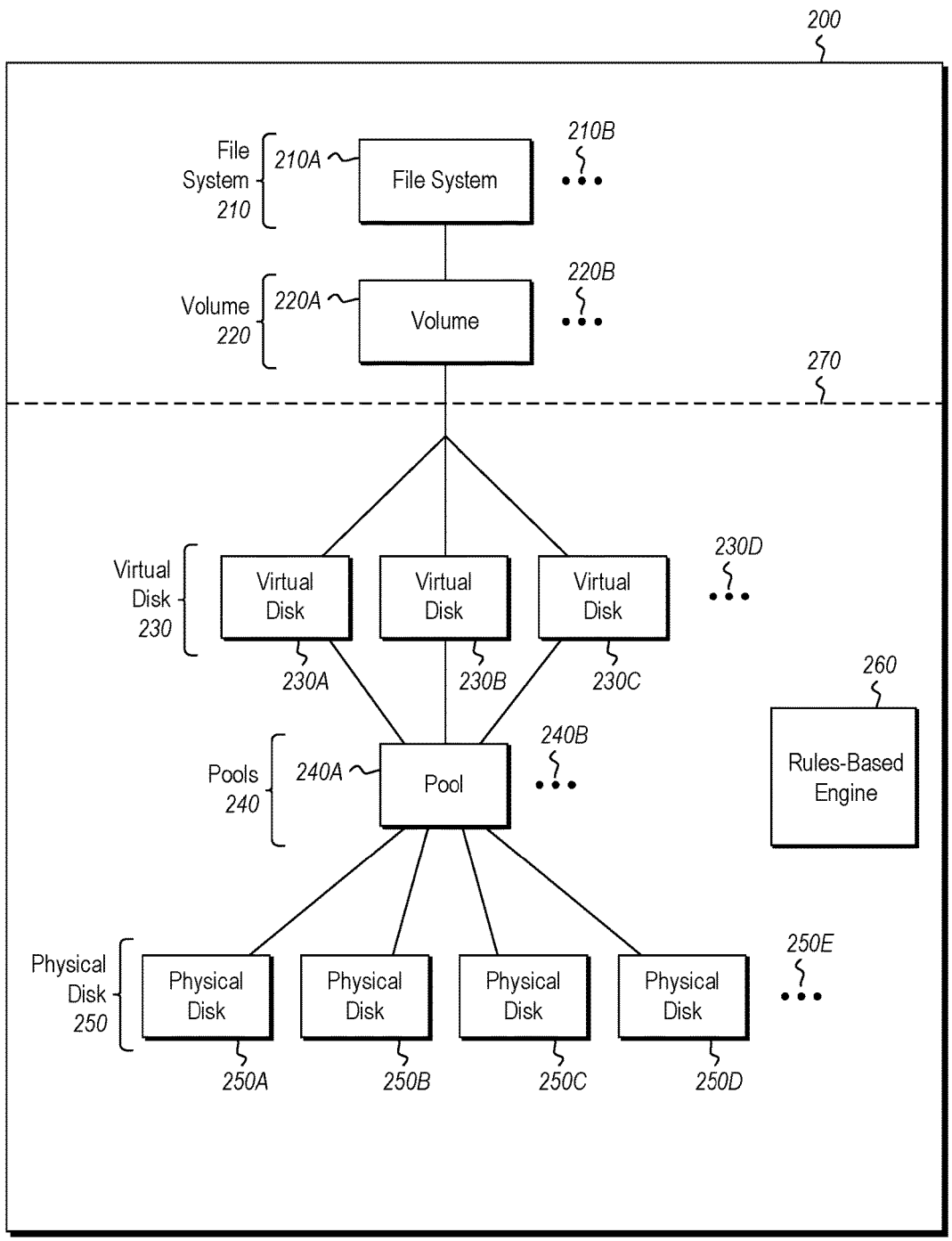
FIG. 2 symbolically illustrates an example computer system architecture for monitoring the computer system.

FIG. 2 illustrates an example architecture of a computer system 200 for monitoring its own health. While many more types of entities could be included, the entities shown are for example purposes only. Accordingly, FIG. 2 illustrates an example computer architecture with various computer system entities, from high-level entities to low-level entities. The principles described herein are not limited to any particular type of entity. However, in the specific example of FIG. 2, the entities are physical disks, pools of disks, virtual disks, volumes, and file systems, which are interrelated in particular ways. That said, the principles described herein are equally applicable to any computing system having any number of entities of any variety of types that are interrelated in any of a variety of ways. However, a specific example will be helpful to extrapolate an understanding of the broader principles encompassed herein. As for the entities themselves, the entities may be executable components or any device or system that an executable component is capable of communicating with, affecting, or being affected by.

As a specific example only, physical disks 250 are shown as components of a pool 240A, with virtual disks 230 being created from the pool. Virtual disks 230 are used to create volume 220 with associated file system 210. In this specific example, there are four physical disks 250A through 250D; but as represented by ellipses 250E, the principles described herein are not limited to the number of physical disks 250, nor to there being any entities that are physical disks. Also, in this specific example, there is one disk pool 240A, but as represented by ellipses 240B, the principles described herein are not limited to the number of pools 240 (nor to there being any entities that are pools). Furthermore, there are three virtual disks 230A through 230C shown, but the ellipses 230D represent that there may be any number, zero or more, of the virtual disks. Next, there is a single volume 220A shown, but the ellipses 220B represent that there may be any number, zero or more, of volumes. Finally, there is a single file system 210A shown, but the ellipses 210B represent that there may be any number, zero or more, of file systems.

The dotted-line 270 represents a barrier between user-visible entities (above the dotted-line 270) and non-user-visible entities (below the dotted-line 270). For instance, in the specific example of FIG. 2, file system 210 and volume 220 are visible to the user, all other entities are not. User-visible entities are those entities that the computer system considers that the user is accustomed to control and/or at least see a visualization of. For example, an ordinary user may only be able to control and/or see visualizations of file system 210 and volume 220.

Notably, computer system 200 also includes rules-based engine 260, which may continually monitor the overall health of the computer system 200. The rules-based engine may further have some level of intelligence and a complete knowledge of the system design. When the system design is updated, the rules-based engine may either automatically become aware of the changes or may be made aware manually. The rules-based engine 260 may be an example of the executable component 106 of FIG. 1.

Furthermore, the rules-based engine may use artificial intelligence to learn and adapt based on the history of the computer system. For example, the rules-based engine may learn and adapt from previous failures that have occurred in the system, previous repairs to the system, the effect of previous repairs to the overall system, the effect of repairs when further repairs are to occur to the system, and so forth. Accordingly, the rules-based engine may use this intelligence and knowledge of the system to present to users intelligent alerts comprising the order of repairs a user should take when problems occur that consider the safety and overall performance of the computer system.

More specifically, the rules-based engine 260 may be configured to identify any failures or problems occurring within the system 200, including a loss of redundancy, a decrease in quality of service, overheating, a decrease in performance, a decrease in capacity, a decrease in available storage, a decrease in processing capabilities, a decrease in memory, a decrease in bandwidth, and so forth. As briefly mentioned, the rules-based engine may further be configured to identify which entities within the system are causing the problems. For instance, if a loss of redundancy has occurred, the rules-based engine may identify that a failure in physical disk 250B has caused the loss of redundancy.

Accordingly, the rules-based engine is not only capable of identifying which entities are causing problems and the relationships of those problem entities to other entities, but can also determine relationship types for each relationship of a problem entity. In one example, there are three basic types of relationships that the rules-based engine may determine; namely, containment relationship types, composition relationship types, and aggregation relationship types, as described herein.

It should also be noted that rules by which the rules-based engine operates may be added or updated. Such rules may be added/updated by any appropriate means, including by download from an appropriate source or even manually by a user. Accordingly, a user may add/update one or more rules of the rules-based engine that correspond to the user's specific needs and circumstances. For example, a user may add a rule that includes lowering the urgency of a particular action to take in alert when the number of disks in a pool that are currently online is greater than 90%.

Figure 3:
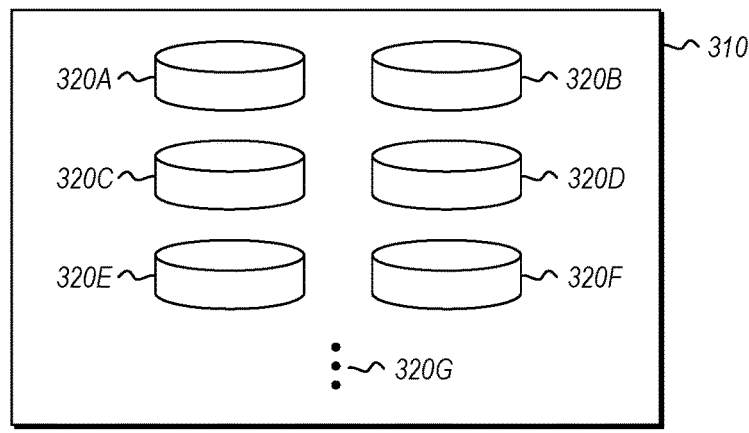
FIG. 3 symbolically illustrates a containment relationship of entities in a computer system.

Containment relationship types generally comprise those relationships in which one entity is contained, or enclosed, within another entity and the enclosed entity is not a component of the container entity. As illustrated in FIG. 3, an example of this may be disks 320A through 320G (referred to collectively herein as "disks 320") contained within storage enclosure 310. Disks 320, while enclosed within storage enclosure 310, are not a component of the storage enclosure. Containment relationship types may also be present when there is only a single path to a given entity. For example, there may be a container relationship between a storage enclosure and a server, wherein the storage enclosure is not shared with any other server (i.e., only that server has access to the storage enclosure). Such a relationship would entail the server being the container and the storage enclosure being the containee.

When two entities having a containment relationship type have been identified, generally the container in the relationship will be the root cause of any problems. Again, using the example illustrated in FIG. 3, if rules-based engine 260 identifies both a failure of one or more of the disks 320 and a failure of the storage enclosure 310, generally the failure of the storage enclosure is causing the failure of the one or more disks (i.e. the failure of the storage enclosure is the root cause of both the storage enclosure failures and the one or more disk failures). Thus, once the problem(s) with the storage enclosure are corrected, the problems with the disks will generally be corrected, as well.

Figure 4:
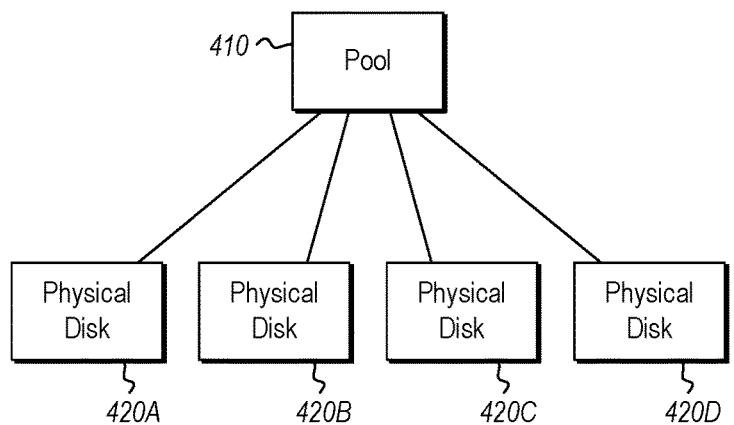
FIG. 4 symbolically illustrates a composition relationship of entities in a computer system.
Figure 5:
FIG. 5 symbolically illustrates an aggregation relationship of entities in a computer system.

Composition relationship types generally comprise those relationships in which one entity is a component of a parent entity. As illustrated in FIG. 4, an example of this may be pool 410 with component physical disks 420A through 420D (referred to collectively herein as "physical disks 420"). Another example of a composition relationship type may be component entities such as a fan, a sensor, or a power supply of a parent entity such as a server or a storage enclosure. When two entities having a composition relationship type have been identified, generally the component entity in the relationship will be the root cause of any identified problems, as opposed to the parent entity being the root cause.

Again, using the example illustrated in FIG. 4, if rules-based engine 260 identifies both a failure of one or more of the physical disks 420 and a failure of the pool 410, generally the failure of the one or more physical disks is causing the failure of the pool (i.e., the failure of one or more physical disks is root cause of both the failures of the one or more disks and the failure of the pool). Thus, once the failure(s) with the physical disks are corrected, the failure of the pool will be corrected, as well.

The rules-based engine may also use its intelligence and knowledge of the system design to identify relationship types between components that may not be initially obvious. For example, the rules based engine may identify a composition relationship type in a computer system that includes virtualized physical connections. Virtualized physical connections can exist where instead of connecting every server to every storage enclosure within the computer system, only one server is connected to the storage enclosures. The rest of the servers in the system then use a network connection to that one server in order to communicate with the storage enclosures. These servers therefore have a virtual connection to the storage enclosures within the system, which virtual connection is seen as being a physical connection by higher software layers in the system.

In such cases, a simple network error will cause the higher software layers to believe that there is a problem with a physical connection, which in reality does not exist. Accordingly, by treating the storage enclosure as having a component relationship with the network connection (i.e., the network connection is a component of the storage enclosure), complaints of a physical connection failure by the higher software layers may generally be filtered out, leaving only the failure of the network connection as the root cause. Thus, virtualized computer entities and particular software may also be seen as entities with entity relationships within a computer system.

Aggregation relationship types generally comprise those relationships in which one entity is only loosely related to another entity. As symbolically illustrated in FIG. 5, an example of this may be volume 510 and its relationship with quality of service (QOS) 520. When two entities having an aggregation relationship type have been identified, generally neither entity is a root cause of a failure in the other. Again, using the example illustrated in FIG. 5, if rules-based engine 260 identifies both a failure of the volume 510 and a problem with QOS 520, generally neither failure is a root cause of the other, regardless of their loosely-based relationship.

Accordingly, as briefly mentioned, utilizing these three relationship types, the rules-based engine may filter out incidental failures/problems that are not root causes. Furthermore, the rules-based engine may be capable of utilizing these three relationship types to help formulate an order in which repairs to the computer system should occur based on the likelihood of identified problems being root causes. For instance, the rules-based engine may assign a certainty value to each identified problem entity based on the types of relationships the particular problem entity has. In such embodiments, the certainty value may represent the certainty that a problem entity and its associated failures/problems is a root cause of one or more failures/problems.

For example, if a problem entity is a component of a problem parent entity, the component (child) problem entity may be assigned a certainty value representing a very high certainty that the component problem entity is a root cause of associated failures/problems. Likewise, the problem parent entity may be assigned a filtering value representing a very low certainty that the parent problem entity is the root cause of associated failures/problems. Similarly, this same logic could be applied to both the containment relationship type and the aggregation relationship type based on the principles described herein.

A more detailed example may include assigning a percentage of certainty regarding whether or not the problem is a root cause. For example, a problem may be given a 100% when there is an absolute certainty that the problem is a root cause (or 0% when there is an absolute certainty that it is not a root cause). In some embodiments, there may be a default level of certainty assigned when it is unclear whether or not the problem is a root cause. Accordingly, the rules-based engine may assign any percentage based on the likelihood of the problem being a root cause. In such embodiments, the rules-based engine may also use artificial intelligence to continue to refine the percentages that it assigns to each problem or problem entity based on previous experience, including the accuracy of previous percentages assigned based on similar problems and/or problem entities and so forth.

The certainty level may be used to determine the order in which the identified problems are prioritized to be resolved (e.g., a problem with 50% certainty that it is a root cause will be emphasized over a problem with a 30% certainty that it is a root cause). Furthermore, there may be a predetermined order of which relationship types take precedence over other relationship types in terms of prioritization of what problems to correct first. This may be based on which relationship type is most likely to be a root cause even though they have the same assigned certainty. For example, there may be situations where two (or more) problems have the exact same certainty of being a root cause, but one is a component in a composition type relationship and the other is a container in a containment type relationship. In such cases there may be an order of precedence such as a component entity taking precedence over a container entity, wherein the component entity is more likely to be a root cause. Thus, the component entity will be prioritized to be corrected before the container entity.

In some embodiments, component entities may take precedence over parent entities, which take precedence over container entities, which take precedence over containee entities, which take precedence over aggregation entities. In other embodiments, component entities may take precedence over container entities, which take precedence over parent entities, which take precedence over containee entities which take precedence over aggregation entities. While these are only a few examples, these orders of precedence may be in any order of the types of entities described herein that fits a particular computer system.

Once a determination has been made regarding the relationship types of identified problem entity relationships, the rules-based engine may make a determination of the order in which repairs of the user-visible entities of the computer system should be performed. This may occur in a number of ways. For example, the rules-based engine may analyze a combination of the identified problems, the identified problem entities, and the determined relationship types in order to determine the order in which repairs of entities with identified problems should occur.

In other embodiments, the rules-based engine may use only the determined relationship types in order to determine the order in which repairs of entities with identified problems should be performed. In yet other embodiments, the rules-based engine may use only an assigned certainty regarding the likelihood of an identified problem being a root cause in order to determine the order in which repairs of entities with identified problems should occur. In yet other embodiments, the rules-based engine may analyze a combination of the identified problems, the identified problem entities, the determined relationship types and any assigned certainty values/percentages in order to determine the order in which repairs of entities with identified problems should be performed. Any combination of the above may also be used in order to determine the order of repair.

Determining an order of repairs may allow for repairing the computer system in a manner that considers the safety of the computer system. For instance, by suggesting an order of repairs in one or more alerts, performance of the computer system, redundancy of data within the computer system, and any other applicable factors may be maintained at the highest level possible during the performance of repairs on the computer system. In this description and in the claims, "safety" of the computer system may be a function of the redundancy of data within the computer system, the performance of the computer system, and/or any other appropriate factor of the computer system. For instance, the safety of the computer system may indicate whether certain loss of data (i.e., loss of all copies of particular data) will occur without immediate repair.

Figure 6:
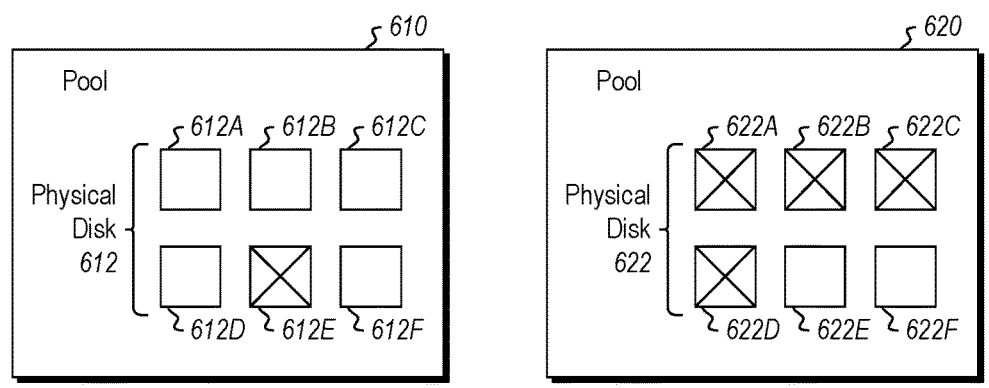
FIG. 6 illustrates an example computer environment for suggesting an order of repairs.

FIG. 6 illustrates a particular example of how safety can be considered in the order of repairs of a computer system. FIG. 6 includes a pool of physical disks 610 and another pool of physical disks 620. Furthermore, pool 610 includes six physical disks 612 (including physical disks 612A through 612F); and pool 620 includes six physical disks 622 (including physical disks 622A through 622F). While in the specific example of FIG. 6, the entities are pools and physical disks, the principles described herein are equally applicable to any computing system having any number of entities of any variety of types that are interrelated in any of a variety of ways. However, a specific example will be helpful to extrapolate an understanding of the broader principles encompassed herein. As for the entities themselves, the entities may be executable components or any device or system that an executable component is capable of communicating with, affecting, or being affected by.

As shown, physical pool 612E of pool 610 has failed (which failure is symbolically) represented by the "X" filling the represented pool 612E. Similarly, physical disks 622A, 622B, 622C, and 622D of pool 612 have also failed. Furthermore, the failure of the aforementioned physical disks would also very likely cause a problem in the pool that would be detected by the rules-based engine. However, because the rules-based engine would detect that the pools 610 and 620 have a component relationship with their corresponding physical disks 612 and 622, the rules-based engine would also very likely determine that the physical disks 612 and 622 are the root causes of the problems detected in the pools 610 and 620. Thus, using entity relationship types, the rules-based engine may ignore the problems caused by the pools, instead focusing on the root causes of the failed physical disks.

Once the rules-based engine has ruled out the problems caused by the pools based on the entity relationship types of the problem entities, there are likely to be two possible orders of repair. The first possible order of repairs (called hereinafter "order 1") is as follows: (i) take pool 610 offline, repair physical disk 612E, and bring pool 610 back online, followed by (ii) take pool 620 offline, repair physical disks 622A, 622B, 622C, and 622D, and bring pool 620 back online. The second possible order of repairs (called hereinafter "order 2") is as follows: (i) Take pool 620 offline, repair physical disks 622A, 622B, 622C, and 622D, and bring pool 620 back online, followed by (ii) Take pool 610 offline, repair physical disk 612E, and bring pool 610 back online. If order 1 is determined to be the preferable order, then taking pool 610 offline will leave pool 620 online with only two functioning physical disks, potentially compromising the redundancy of data within computer system 600. Alternatively, if order 2 is determined to be the preferable order, then taking pool 620 offline will leave pool 610 online, leaving five functioning physical disks online. Accordingly, the order of repairs can be determined from a number of orders of repairs based on an evaluation of the effect on the safety of the computer system.

In some embodiments, an evaluation of the safety of the computer system with respect to one or more orders of repairs may comprise utilizing artificial intelligence gathered from the effects of previous repairs of problem entities that have a particular relationship type, previous repairs of currently identified problems, previous repairs of the same entity or type of entity, previous sequential repairs on particular entities (e.g., repairing a physical drive right after repairing a fan), and so forth.

In other embodiments, a determination of the order of repairs may include an estimation of the ease of performing repairs on the computer system with respect to one or more possible orders of repair. For example, the rules-based engine may determine that in a circumstance where both a fan and a sensor need to be replaced, replacing the sensor before the fan will simplify the overall process, making it easier for a user to complete the suggested repairs. Thus, the rules-based engine may consider the difficulty level of performing each suggested repair and ensure that the order of repairs is as simple to perform as possible.

A determination of the order of repairs may also include an evaluation of what repairs are most urgent. The evaluation of urgency may be based on any applicable factors, including the persistence of a problem, the impact of a problem on the overall system, the impact of the problem on a specific entity (or entities), and so forth. For instance, referring to FIG. 6 once again, the rules-based engine may perform an analysis and determine that repairing the failed physical disks 622 of pool 620 is much more urgent than repairing the failed physical disk 612E of pool 610. In this example, the urgency would likely depend on the probability of losing data redundancy, or the loss of particular data entirely, if further failures in the system were to occur. In other embodiments, urgency may relate to performance of the computer system, safety of the computer system, or any other appropriate factors. Thus, the rules-based engine may determine an order of repairs based on safety of the computer system, urgency of the repair(s), ease of performing the repair(s), or any other applicable factor.

In some embodiments, considerations of safety, urgency, and ease may be competing interests. Accordingly, there may be circumstances where any of these three considerations are deemed to take priority over the others. For instance, using a common example herein, the danger of a loss of redundancy may be an urgent enough problem in certain circumstances that urgency then takes priority over both safety and ease of repair. In another embodiment, the occurrence of a total loss of redundancy may be certain without immediate repair, which may coincide with the definition of safety. Accordingly, in that particular circumstance safety would take priority over urgency and ease of repair.

Once the order in which repairs of user-visible entities with identified problems should be performed has been determined, one or more alerts comprising the determined order of repairs may be presented to a user. Such alerts may comprise one or more repairs the user can make with respect to one or more user-visible entities of the computer system in order to fix any identified problems. Accordingly, rules-based engine 260 may only present alerts regarding actions that the user can take with respect to the file system and/or volume.

What is user-visible may be dependent on an identification of the user. For example, a user that is an information technology (IT) professional or an administrator of the system may have access to more user-visible entities than an ordinary user. In another example, an engineer may have more access to various entities in a system than an administrator. For instance, an engineer may have access to all entities of a system, while an administrator of the same system may have at least partially restricted access.

Accordingly, the complexity of actions set forth in an alert may be dependent on an identification of the user. For example, an IT professional or system administrator may receive alerts with complex technical aspects and actions to be taken, while an ordinary user may receive alerts with minimal technical detail and complexity. Likewise, an engineer may receive alerts with even more complex technical aspects and actions to be taken than an administrator. Thus, the rules-based engine may factor the identification of a user into the determination of an order of repairs. It should also be noted that identification of the user can take place through any appropriate means. For instance, a user may be able to input credentials, input subscription information, request more detailed access to the system, and so forth. Accordingly, a user, such as an engineer or other technical person, may be able to input credentials that allow the user to see entities and problems that would not otherwise be user-visible (i.e., those entities/problems had been filtered out).

As briefly mentioned, an alert may comprise any appropriate repair or action to be taken by a user to restore a system to good health. Potential actions presented in an alert are almost limitless and may include restarting a computer, removing a software program, installing a software program, resetting a computer to factory settings, replacing a hardware storage device, replacing a fan, replacing a sensor, and so forth. Furthermore, along with an order of specific repairs, alerts may comprise timeframes within which one or more particular entities or identified problems need to be repaired.

In some embodiments, any determined root causes may be fixed by the computer system itself or an administrator of the system, rather than presenting an alert to the user. In other embodiments, the rules-based engine may filter out some root causes from presentation to the user, thus allowing the computer system or an administrator to fix those particular root causes. For example, the computer system and/or an administrator may fix every root cause possible, thus presenting to the user only the root causes that necessitate an external actor. In yet other embodiments, the rules-based engine may filter out all of the root causes from presentation to the user, whether or not they are fixed by the computer system or an administrator of the system. For example, the rules-based engine may determine that none of the root causes are at an urgency level that necessitates either presenting an alert to a user or having the computer system or an administrator fix the root cause.

Furthermore, a user may be able to ask the system if it is okay to perform one or more repairs (e.g., is it safe to perform a particular repair(s)?). For instance, a user may identify a problem with a computer system before the computer system has alerted the user. The user may then be able to ask the computer system whether, and how, to proceed with repairs. In such cases, the rules-based engine may use it's machine learning capabilities and inherent knowledge of the overall computer system to give detailed feedback to the user regarding how to proceed with repairs, including suggesting a particular order of repair. In some embodiments, the rules-based engine may determine that the user should not proceed with any repairs or alert the user that in order to perform the user-suggested repairs, the user is advised to first repair another entity or problem identified by the rules-based engine.

Figure 7:
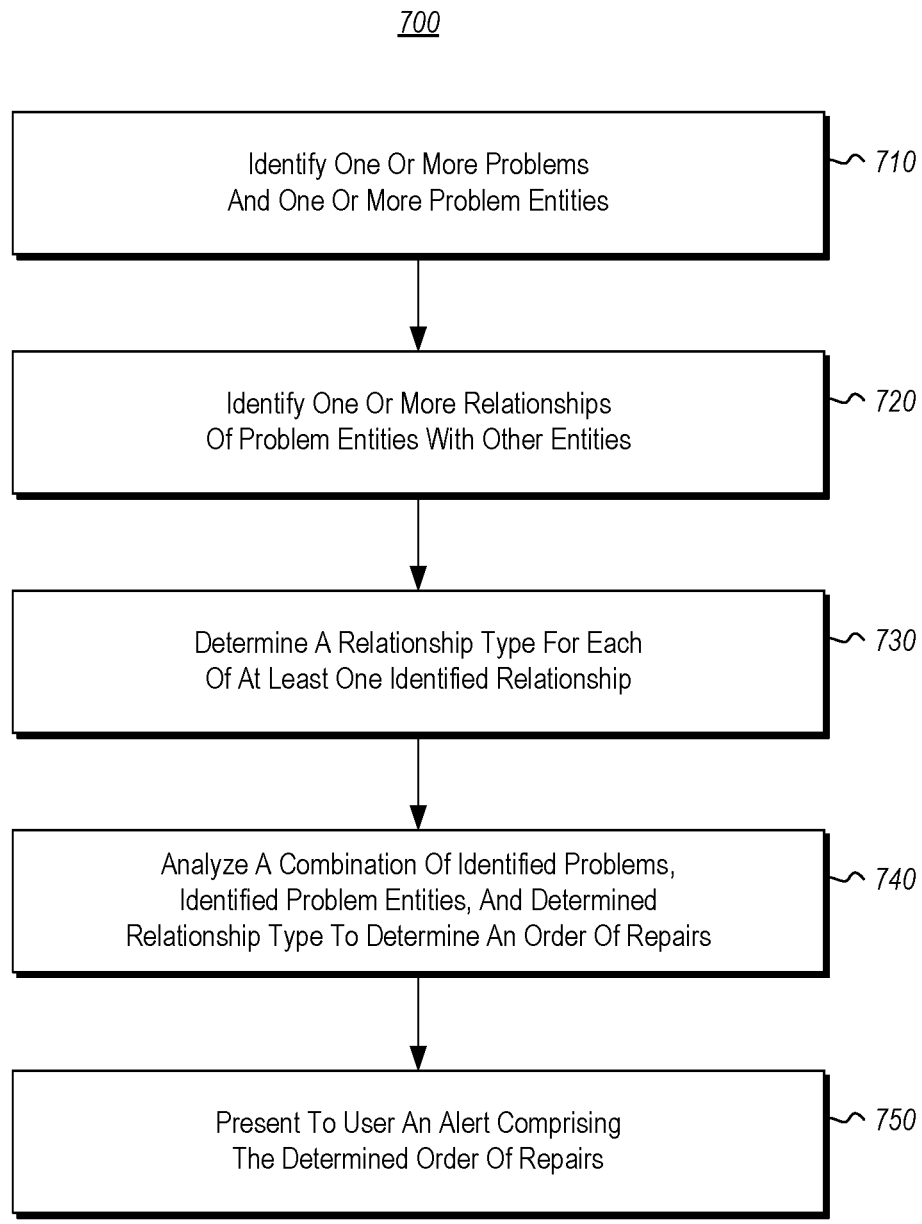
FIG. 7 illustrates a flow chart of an example method for monitoring the health of a computer system and suggesting an order of repair.

FIG. 7 illustrates a flow chart of an example method 700 for monitoring and maintaining the health of a computer system based on the relationships of entities of the computer system. Method 700 will be described with respect to the entities of computer architecture 200. Likewise, the method 700 will also be described using the more specific example from FIG. 6, comprising the failure of physical disk 612E in pool 610, as well as the failure of physical disks 612A, 612B, 612C, and 612D of pool 620. It will also be assumed that the failures of the aforementioned physical disks have caused problems with the pools 610 and 620, which may in turn cause problems in other entities. The method begins when one or more problems within a computer system and one or more entities within the computer system that are causing the one or more problems are identified (Act 710). In this instance, the rules-based engine may have identified problems such as a loss of redundancy, a failure of the specified disks, and a failure of the pool.

One or more relationships the problem entities have with other entities in the computer system are then identified (Act 720). For example, the rules-based engine may determine that the physical disks have a relationship with the pools and that the pools have a relationship with both the physical disks and one or more virtual disks. A relationship type for each of at least one of the identified relationships is then determined (Act 730). Here, the rules-based engine may identify that the physical disks and the pools have a composition relationship, wherein the physical disks are the component children entities and the pools are the parent entities. Furthermore, the rules-based engine may identify problems with the computer system 600 not only at the physical disk level, but also at the pool level. However, because the rules-based engine would identify the relationship between the physical disks and the pools as a composition relationship type, the rules-based engine would also almost certainly identify that the root causes of the identified problems are being caused by the component entities (i.e., the physical disks are causing the identified problems). Accordingly, the rules-based engine would likely ignore the problems of the pool, focusing instead on the failed physical disks as the root cause of both the problems at the pool level and the physical disk level.

A combination of the one or more identified problems, the one or more identified problem entities, and the determined relationship type are then analyzed to thereby determine an order in which repairs of one or more visible entities of the computer system should occur. (Act 740). Here, the rules-based engine would likely first determine, as implied above, that the problems with the pools 610 and 620 are only incidental to the problems caused by the failed physical disks of those pools (i.e., the failed physical disks are the root causes). Once that determination has been made, the rules-based engine may identify two possible orders of repair. The first possible order of repairs (called hereinafter "order 1") is as follows: (i) take pool 610 offline, repair physical disk 612E, and bring pool 610 back online, followed by (ii) take pool 620 offline, repair physical disks 622A, 622B, 622C, and 622D, and bring pool 620 back online. The second possible order of repairs (called hereinafter "order 2") is as follows: (i) Take pool 620 offline, repair physical disks 622A, 622B, 622C, and 622D, and bring pool 620 back online, followed by (ii) Take pool 610 offline, repair physical disk 612E, and bring pool 610 back online. Accordingly, in order to repair any single physical disk in either pool 610 or pool 620, the entire pool of physical disks is to be taken offline.

Thus, using order 1 would include taking all of pool 610 offline in order to repair physical disk 612E. Accordingly, while repairing physical disk 612E, only physical disks 622E and 622F of pool 620 would be left online. In such a case, only two of the 12 physical disks of computer system 600 would be left online, potentially causing a complete loss of redundant data. On the other hand, performing repairs using order 2 would provide the five functioning physical disks 612 to stay online during repairs of physical disks 622, resulting in a scenario that leaves as much redundant data online as possible during repairs. Thus, order 2 would almost certainly be the suggested order of repairs.

Finally, an alert that comprises the determined order of repairs is presented to the user (Act 750). Here, as described above, the order of repairs would almost certainly be to take pool 620 offline in order to fix its failed physical disks, bring pool 620 back online, and then to do the same with the failed physical disk of pool 610. It should be noted, however, that depending on the identification of the user, replacing the disks potentially may not be presented as an alert to the user. For example, if the user is an administrator of the computer system then that user would likely receive such an alert. On the other hand, a typical user may not be likely to receive such an alert because the physical disk may not to be a user-visible entity in such a case. Therefore, such an identified problem (i.e., one that is not related to a user-visible entity) in the case of a typical user would potentially be a problem that would need to be corrected by the system itself or an administrator of the system.

In this way, monitoring and further automated analysis can be performed on large, complex computer systems that have multiple and complex problems by utilizing a rules-based engine to determine an order of repairs of the multiple problems. Accordingly, the rules-based engine may create alerts that comprise an order for performing repairs such that the safety of the computer system, urgency of repairs, and ease of performing repairs are considered when suggesting the order of repairs. For instance, by suggesting an order of repairs in an alert, performance of the computer system, redundancy of data within the computer system, and other applicable factors may be maintained at the highest level possible during the performance of repairs on the computer system. Furthermore, alerts comprising the order of repairs are provided to users based on an identification of the user, such that the alerts only contain actionable content relating to entities that the user can view and understand.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system for continually monitoring the health of the computer system based on entity relationships, comprising:
    one or more processors; and
    one or more storage devices having stored thereon computer-executable instructions that are executable by the one or more processors, and that configure the system to monitor the health of the computer system and suggest an order of repair, including computer-executable instructions that configure the computer system to perform the following:
        identify one or more problems within the computer system and one or more candidate entities within the computer system that are identified as being associated with the one or more problems; and
        for each identified candidate entity, perform at least the following:
            identify one or more relationships that the candidate entity has with other entities in the computer system;
            for each identified relationship of the candidate entity, perform at least the following:
                determine a relationship type for each identified relationship of the candidate entity; and
                based on each determined relationship type, determine a relationship status of each entity within the identified relationship of the determined relationship type; and
            based at least partially on the determined relationship type of the one or more identified relationships of the candidate entity and the determined relationship status of each entity within the one or more identified relationships of the candidate entity,
            generate a certainty value associated with each of the one or more candidate entities, the certainty value for a given entity indicating a likelihood of the given entity being a root cause of at least one of the one or more problems;
            determine an order in which repairs of one or more user-visible entities of the computer system are to occur in order to address the one or more identified problems; and
            present to a user an alert comprising the determined order of the repairs.

2. The computer system of claim 1, wherein at least one of the one or more relationships comprises a container relationship type, wherein the relationship status of the candidate entity within the container relationship comprises a child relationship status.

3. The computer system of claim 1, wherein the determination of the order of repairs further includes an evaluation of the safety of the computer system with respect to one or more possible orders of repair.

4. The computer system of claim 3, wherein the evaluation of safety of the computer system comprises utilizing artificial intelligence gathered from (i) previous repairs of problem entities that have a particular relationship type and/or (ii) previous repairs of currently identified problems.

5. The computer system of claim 3, wherein the evaluation of safety of the computer system comprises an analysis of the health of redundant data within the computer system with respect to one or more orders of repair.

6. The computer system of claim 1, wherein the determination of the order of repairs further includes an estimation of ease of repair of the computer system with respect to one or more possible orders of repair.

7. The computer system of claim 1, wherein the determination of the order of repairs further includes an evaluation of what repairs are most urgent.

8. A method, implemented at a computer system that includes one or more processors, for continually monitoring the health of the computer system and suggesting an order of repair, the method comprising:
    identifying one or more problems within the computer system and one or more candidate entities within the computer system that are identified as being associated with the one or more problems; and
    for each identified candidate entity, performing at least the following:
        identifying one or more relationships that the candidate entity has with other entities in the computer system;
        for each identified relationship of the candidate entity, perform at least the following:
            determining a relationship type for each identified relationship of the candidate entity; and
            based on each determined relationship type, determining a relationship status of each entity within the identified relationship of the determined relationship type; and
        based at least partially on the determined relationship type of the one or more identified relationships of the candidate entity and the determined relationship status of each entity within the one or more identified relationships of the candidate entity,
        generating a certainty value associated with each of the one or more candidate entities, the certainty value for a given entity indicating a likelihood of the given entity being a root cause of at least one of the one or more problems; and
        determining an order in which repairs of one or more user-visible entities of the computer system are to occur in order to address the one or more identified problems.

9. The method of claim 8, wherein at least one of the one or more relationships comprises a container relationship type, wherein the relationship status of the candidate entity within the container relationship comprises a child relationship status.

10. The method of claim 8, wherein the determination of the order of repairs further includes an evaluation of the safety of the computer system with respect to one or more possible orders of repair.

11. The method of claim 10, wherein the evaluation of safety of the computer system comprises utilizing artificial intelligence gathered from (i) previous repairs of problem entities that have a particular relationship type and/or (ii) previous repairs of currently identified problems.

12. The method of claim 10, wherein the evaluation of safety of the computer system comprises an analysis of the performance of the computer system with respect to one or more possible orders of repair.

13. The method of claim 8, wherein the determination of the order of repairs further includes an estimation of ease of repair of the computer system with respect to one or more possible orders of repair.

14. The method of claim 8, wherein the determination of the order of repairs further includes an evaluation of what repairs are most urgent.

15. The method of claim 8, the method further comprising the following prior to the presentation of the alert to the user:
identifying a user of the computer system; and
based on the identification of the user, determining that the one or more user-visible entities are visible.

16. A computer program product comprising one or more physical and tangible hardware storage devices having stored thereon computer-executable instructions that are executable by one or more processors of a computer system and that configure the computer system to continually monitor the health of the computer system and suggest an order of repair, including computer-executable instructions that are executable to configure the computer system to perform the following:
identify one or more problems within the computer system and one or more candidate entities within the computer system that are identified as being associated with the one or more problems; and
for each identified candidate entity, perform at least the following:
identify one or more relationships that the candidate entity has with other entities in the computer system;
for each identified relationship of the candidate entity, perform at least the following:
determine a relationship type for each identified relationship of the candidate entity; and
based on each determined relationship type, determine a relationship status of each entity within the identified relationship of the determined relationship type; and
based at least partially on the determined relationship type of the one or more identified relationships of the candidate entity and the determined relationship status of each entity within the one or more identified relationships of the candidate entity,
generate a certainty value associated with each of the one or more candidate entities, the certainty value for a given entity indicating a likelihood of the given entity being a root cause of at least one of the one or more problems; and
determine an order in which repairs of one or more user-visible entities of the computer system are to occur in order to address the one or more identified problems.

17. The computer program product of claim 16, wherein at least one of the one or more relationships comprises a container relationship type, wherein the relationship status of the candidate entity within the container relationship comprises a child relationship status.

18. The computer program product of claim 16, wherein the determination of the order of repairs further includes an evaluation of the safety of the computer system with respect to one or more possible orders of repair.

19. The computer program product of claim 16, wherein the determination of the order of repairs further includes an estimation of ease of repair of the computer system with respect to one or more possible orders of repair.

20. The computer program product of claim 16, wherein the determination of the order of repairs further includes an evaluation of what repairs are most urgent.

* * * * *